US007304640B2

(12) United States Patent
Yamashita et al.

(10) Patent No.: US 7,304,640 B2
(45) Date of Patent: Dec. 4, 2007

(54) METHOD OF MEASURING LUMINANCE OF IMAGE DISPLAY APPARATUS, METHOD OF MANUFACTURING THE SAME, METHOD AND APPARATUS FOR ADJUSTING CHARACTERISTICS OF THE SAME

(75) Inventors: Masataka Yamashita, Kanagawa (JP); Eiji Yamaguchi, Kanagawa (JP); Akihiko Yamano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 10/626,650

(22) Filed: Jul. 25, 2003

(65) Prior Publication Data

US 2004/0174323 A1 Sep. 9, 2004

(30) Foreign Application Priority Data

Jul. 26, 2002 (JP) ............................. 2002-218204
Jul. 24, 2003 (JP) ............................. 2003-279137

(51) Int. Cl.
*G06F 3/038* (2006.01)
*G09G 5/00* (2006.01)
*G09G 3/30* (2006.01)

(52) U.S. Cl. ........................................ 345/207; 345/81

(58) Field of Classification Search ............ 345/20–22, 345/28, 31, 47, 55, 63, 72, 73, 74.1, 75.1, 345/75.2, 88, 76–83, 102, 103, 204–208, 345/214, 215, 690, 691, 98; 250/200, 203.3, 250/203.5, 204, 205, 208.1, 549, 552, 553, 250/559.1, 559.04; 313/495–497, 523–527, 313/540–543; 315/151, 155, 169.1, 169.3
See application file for complete search history.

(56) References Cited

U.S. PATENT DOCUMENTS 4,989,072 A * 1/1991 Sato et al. .................. 348/180
5,115,229 A * 5/1992 Shalit .......................... 345/2.2
5,510,851 A * 4/1996 Foley et al. ................ 348/658
6,388,648 B1 * 5/2002 Clifton et al. ................ 345/88
6,604,972 B1 8/2003 Yamano ....................... 445/24
6,621,475 B1 9/2003 Yamaguchi et al. ........ 345/74.1
6,677,706 B1 1/2004 Hara et al. .................. 313/496
6,717,560 B2 * 4/2004 Cok et al. ...................... 345/82
6,726,520 B2 4/2004 Takeda et al. ................ 445/62

(Continued)

FOREIGN PATENT DOCUMENTS

EP 0 803 892 A2 10/1997

(Continued)

*Primary Examiner*—Jeff Piziali
(74) *Attorney, Agent, or Firm*—Fitzpatrick, Cella, Harper & Scinto

(57) ABSTRACT

A method of measuring luminance of an image display apparatus, a method of manufacturing the same, and a method and an apparatus for adjusting characteristics of the same, in which accuracy of measurement is improved while reducing time for measuring luminance of a pixel are provided. A plurality of devices that are not adjacent to each other (for example the devices of the same color out of R, G, and B) are selected and illuminated simultaneously, and luminance is measured for each of them. Based on measured luminance, the electron-emitting characteristics of the respective electron-emitting device as are adjusted based on measured luminance.

8 Claims, 16 Drawing Sheets

U.S. PATENT DOCUMENTS

| | | | | |
|---|---|---|---|---|
| 6,752,676 | B2 | 6/2004 | Yamashita et al. | 445/6 |
| 6,760,001 | B2 | 7/2004 | Kanda et al. | 345/74.1 |
| 6,822,397 | B2 | 11/2004 | Kawasaki et al. | 315/169.2 |
| 6,862,029 | B1 * | 3/2005 | D'Souza et al. | 345/690 |
| 6,879,096 | B1 * | 4/2005 | Miyazaki et al. | 313/495 |
| 6,900,832 | B1 * | 5/2005 | Yano | 348/222.1 |
| 6,903,714 | B2 * | 6/2005 | Tobiya | 345/89 |
| 2003/0083843 | A1 | 5/2003 | Yamano et al. | 702/127 |
| 2003/0179192 | A1 * | 9/2003 | Allen et al. | 345/207 |
| 2005/0104877 | A1 * | 5/2005 | Nakamura et al. | 345/207 |

FOREIGN PATENT DOCUMENTS

| | | |
|---|---|---|
| JP | 4-55535 | 5/1992 |
| JP | 5-347776 | 12/1993 |
| JP | 7-294889 | 11/1995 |
| JP | 9-198007 | 7/1997 |
| JP | 10-228867 | 8/1998 |
| JP | 2000-115801 | 4/2000 |
| JP | 2000-121497 | 4/2000 |

* cited by examiner

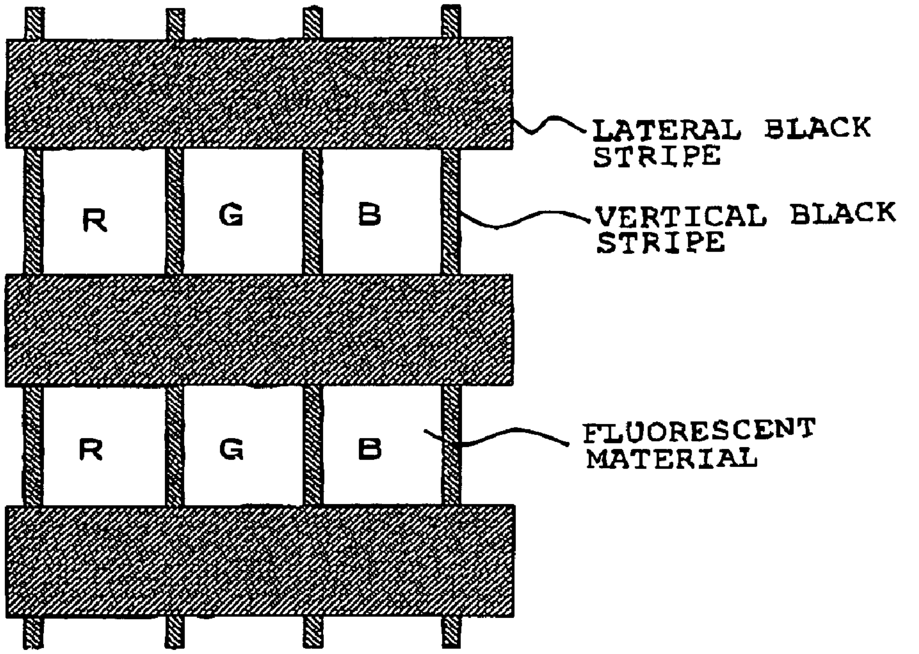
Fig.7A FACEPLATE
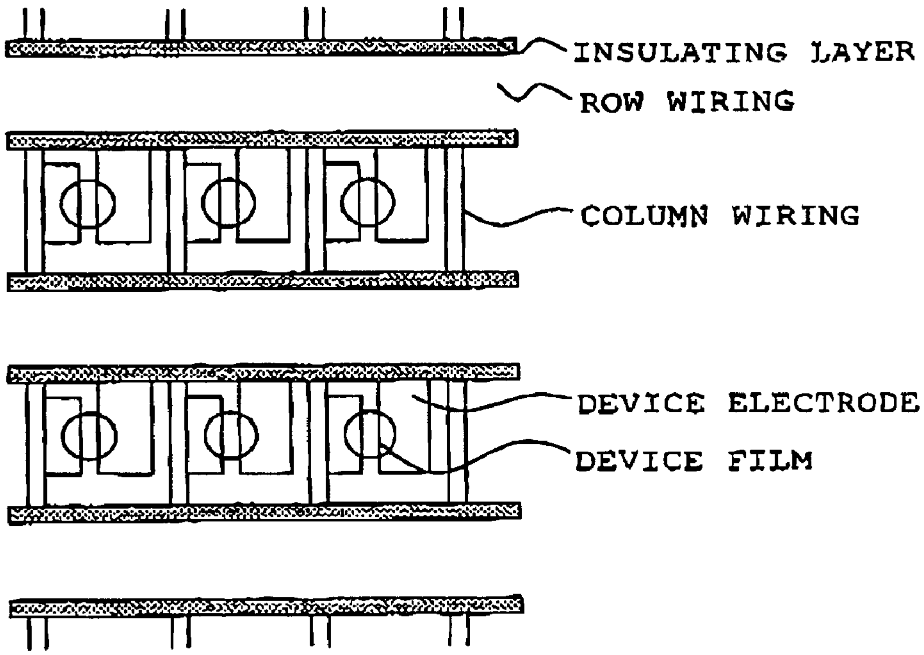
Fig.7B REAR PLATE

METHOD OF MEASURING LUMINANCE OF IMAGE DISPLAY APPARATUS, METHOD OF MANUFACTURING THE SAME, METHOD AND APPARATUS FOR ADJUSTING CHARACTERISTICS OF THE SAME

This application claims the right of priority under 35 U. S. C. §119 based on Japanese Patent Application No(s). JP2002-218204, filed on Jul. 26th, 2002 and JP 2003-279137 filed on Jul. 24th, 2003 which are hereby incorporated by reference in their entirety as if fully set forth herein.

BACKGROUND OF THE INVENTION

1. Field of the Invention

The present invention relates to a method of measuring luminance of an image display apparatus, a method of manufacturing the same, and a method and an apparatus for adjusting characteristics of the same, for adjusting luminance of pixels provided in the image display apparatus.

2. Description of the Related Art

In the related art, as a method of inspecting luminance of an image display apparatus, a method of inspecting pixel of a liquid crystal panel using a linear sensor is disclosed in, for example, JP-UM-A-4-055535 (Document 2). In addition, in an image display apparatus employing a surface conduction electron-emitting device (hereinafter referred to as SCE device), a method of adjusting characteristics by measuring emission luminance of a fluorescent material and applying a characteristic shifting voltage to each device is disclosed in JP-A-10-228867 (Document 1).

As shown in FIG. 2, the SCE device demonstrates non-linear characteristics for the device current If and the emission current Ie with respect to the device voltage Vf, and has a definite threshold voltage Vth for the emission current Ie.

Utilizing the characteristics described above, as shown in FIG. 11, an image display apparatus In which the SCE devices 4001 are arranged into a passive matrix by being connected in rows and columns including wiring resistances 4004, 4005 and are applied as an electron source is proposed.

When applying the multi-electron source to an image display apparatus operated by the passive matrix, suitable electric signals are applied to row wirings 4002 and column wirings 4003 for allowing a device corresponding to an arbitrary pixel to output a desired emission current. Simultaneously, a high voltage is applied to an anode electrode, not shown.

As in the case of a general timesharing driving, part of th row wirings 4002 are periodically and sequentially selected, and a selected voltage Vs is applied to a terminals of the selected row wirings 4002 and, simultaneously, a non-selected voltage Vns is applied to terminals of the non-selected row wirings 4002. Synchronously, modulating voltages Ve1-Ve6 for allowing emission current to be output according to information on images to be displayed are applied to terminals of the column wirings 4003.

Now, the voltages Ve1-Ve6, Vs, and Vns are set to suitable values so that a voltage larger than the threshold voltage Vth is applied to the selected devious and a voltage smaller than the threshold voltage Vth is applied to the non-selected devices, an mission current of a desired intensity is output only from the selected devices. Alternatively, instead of modulating the amplitude of the modulating voltage corresponding to gradation information in this manner, it is also possible to modulate the pulse duration of the modulating voltage. A operating method in combination of modulation of the amplitude of voltage and modulation of pulse duration is also applicable.

However, there is a problem in that the multi-electron source including a number of electron-emitting devices arranged may cause some variations in electron-emitting characteristics of the individual electron-emitting device due to variations in process, and thus when it is applied to a large flat image display apparatus. variations in characteristics of the respective electron-emitting devices may result in variations in luminance.

The possible reasons why the electron-emitting characteristics of the electron-emitting devices in the multi-electron source differ from each other may be various causes such as variations in component of the material used for an electron-emitting section, tolerance of dimensions and configurations of each member of the device, non-uniform energizing condition in the energization forming process, and non-uniformity in energizing conditions or ambient gas In the energization activation process.

In order to remove all these causes, highly advanced manufacturing equipment or very strict process control are required, and satisfying these requirements involves huge manufacturing costs, which is not practical.

In the document 1 described above, a method of manufacturing an image display apparatus including a step of measuring the respective characteristics and a step of applying a characteristic shifting voltage for adjusting the respective characteristics to a value corresponding to the reference value in order to remove variations is disclosed. However, it was not sufficient in the following reasons.

Measurement of the characteristics of the device required for adjusting the characteristics of the device will now be described.

In the related art, measurement of the characteristics of the d vice includes the steps of selecting a device, applying a voltage thereto, measuring the emission current Ie and luminance, and storing the results in a memory, and repeating the-above described steps for every device. When measuring luminance, adjustment of the characteristics may include adjustment of variations in light-emitting characteristics of a fluorescent material.

This process will be described further in detail referring to a flowchart in FIG. 15.

In a first place, a device is selected by a switch matrix (S1), and an amplitude data Tv is output (S2). Then a pulse signal is applied (S3), the emission current Ie is detected (S4) and the detected result is stored in the memory (S5).

Whether or not the steps from S3 to S5 has completed for every device is determined. If not, a new device is selected (S7) and the steps from S3 to S5 are performed.

When the steps were completed for every device, the Ie of all the devices are compared, and the memory voltages to be applied to the respective devices are determined (S8), the results are stored in the memory (S9). When the steps were not completed, the procedure returns to S3.

The process of measuring the characteristics of the device above has a problem in that when applied to an image display apparatus having a large number of pixels such as a high-resolution image display apparatus including a prevailing high quality TV, time period required for performing these steps increases, which results in lowering of productivity.

In addition, measurement of luminance of each pixel may result in considerable lowering of accuracy of measurement of luminance signal of the device to be measured due to the influence from the adjacent devices, such as color mixture, caused by misalignment of the fluorescent material or displacement of irradiating position of electron beams.

Furthermore, when a P22, which is a fluorescent material which is generally used in CRT is used, the duration of after-glow of the fluorescent material will be in the order of 10 μsec for green and blue, and 1 msec for red.

When measuring light emission from one device successively using an optical measuring system, considering the duration of after-glow, the interval of driving between one device and the next device must include a period corresponding to the duration of after-glow.

Therefore, when a high definition display having pixels about 1280×RGB×768 is constructed, it takes about 1000 seconds for measuring all the points.

The light-emitting characteristics of the fluorescent materials of three primary colors, that is, red fluorescent material (R), green fluorescent material (G), and blue fluorescent material (B), are Influenced by the material used or by the state in which the fluorescence material is formed, in addition to the amount of irradiation of electron corresponding to the electron-emitting characteristics of the electron-emitting device that allows the fluorescent material to emit light.

When considering white balance as a display characteristic, there may be the case in which complicated operation, such as performing adjustment of the light-emitting characteristics of the fluorescent material (the gamma characteristics which is general in CRT), or performing adjustment of the electron-emitting characteristics of the electron-emitting device to achieve the optimal white balance over the entire display unit after sensitivity of a measuring instrument is corrected, is required.

As described above, in the related art, it has taken a long time for measuring the characteristics of the respective pixels in order to adjust luminance of the pixels. In addition, accuracy of measurement was not sufficient.

Accordingly, it is an object of the present invention to provide a method of measuring luminance of an image display apparatus, a method of manufacturing the same, and a method and an apparatus for adjusting characteristics of the same, in which a time period required for measuring luminance of a pixel is reduced, and measuring accuracy is improved.

SUMMARY OF THE INVENTION

In order to achieve the object described above, a method of measuring luminance of an image display apparatus according to the present invention is a method of measuring luminance of an image display apparatus having an adjacently disposed plurality of pixels for displaying red, blue and green arranged in matrix, comprising the steps of:

illuminating the pixel in a time-sharing basis for each color, and measuring luminance of the illuminated pixels for each illumination.

Preferably, measurement of luminance of the pixel is performed with a luminance measuring unit having a plurality of optical sensors arranged in matrix by the steps of:

dividing a display area of the image display apparatus into a plurality of blocks corresponding to measuring area of the luminance measuring unit, each including a plurality of pixels, and moving the luminance measuring unit on each divided block for measuring luminance of each pixel.

Preferably, a plurality of the aforementioned luminance measuring units are disposed on the image display apparatus and luminance of the pixels are simultaneously measured by the plurality of luminance measuring units.

Preferably, the pixels included in each divided block are simultaneously illuminated in color-to-color basis and luminance of the pixels In each color is measured.

A method of manufacturing an image display apparatus according to the present invention is a method of manufacturing of an image display apparatus having an adjacently disposed plurality of pixels for displaying red, blue and green arranged in matrix, comprising the steps of:

illuminating the pixels in a time-sharing basis for each color and measuring luminance of the illuminated pixels for each illumination; and adjusting luminance of each pixel based on the result of measurement in the measuring step.

In a method of adjusting characteristics of an image display apparatus according to the present invention is a method of adjusting characteristics of an image display apparatus comprising a multi-electron source having a plurality of electron-emitting device arranged on a substrate, and a fluorescent member emitting light by being irradiated by emitted electrons from the electron-emitting device, comprising the steps of:

dividing a display area of the image display apparatus into a plurality of areas and measuring luminance of each divided area sequentially; and shifting the electron-emitting characteristics of each electron-emitting device to a predetermined target value by applying a characteristic shifting voltage based on the result of the step of measuring, wherein the step of measuring includes the steps of:

allowing the electron-emitting devices that are not adjacent to each other in the divided area to emit electrons simultaneously, and measuring luminance of the fluorescent member that emits light upon irradiation of the emitted electrons.

Preferably, the electron-emitting devices that are not adjacent to each other in the divided area are devices selected from the electron-emitting devices that emit electrons to the fluorescent member of any one of the colors selected from the red fluorescent material, the green fluorescent material, and the blue fluorescent material.

A characteristic adjusting apparatus of an image display apparatus according to the present invention in a characteristic adjusting apparatus of an image display apparatus having a plurality of electron-emitting devices disposed on a substrate, comprising:

a selecting and driving unit for selecting and driving a plurality of electron-emitting devices that are not adjacent to each other in a predetermined area on a display unit of the image display apparatus simultaneously, a timing signal generating unit being synchronous with a driving time of the selecting and driving unit, a light-emitting unit for emitting light by the emitted electrons from the electron-emitting devices, at least one luminance measuring unit for taking a luminance signal from the light-emitting unit synchronously with outputs from the timing signal generating unit.

a calculating unit for obtaining light-emitting characteristics of selected devices on the basis of a signal obtained from the luminance measuring unit and information of selection of the plurality of devices from the driving unit individually, a storing unit for storing an output from the calculating unit;

a voltage applying unit for applying a characteristic sifting voltage to the plurality of selected devices; and at least one moving unit for relatively moving the luminance measuring unit and the display panel,

BRIEF DESCRIPTION OF THE DRAWINGS

FIG. 7A is a schematic drawing showing a construction of a faceplate of the image display apparatus according to the first embodiment of the present invention, and FIG. 7B is a schematic drawing showing a construction of a rear plate of the same image display apparatus;

DESCRIPTION OF THE PREFERRED EMBODIMENTS

Figure 1:
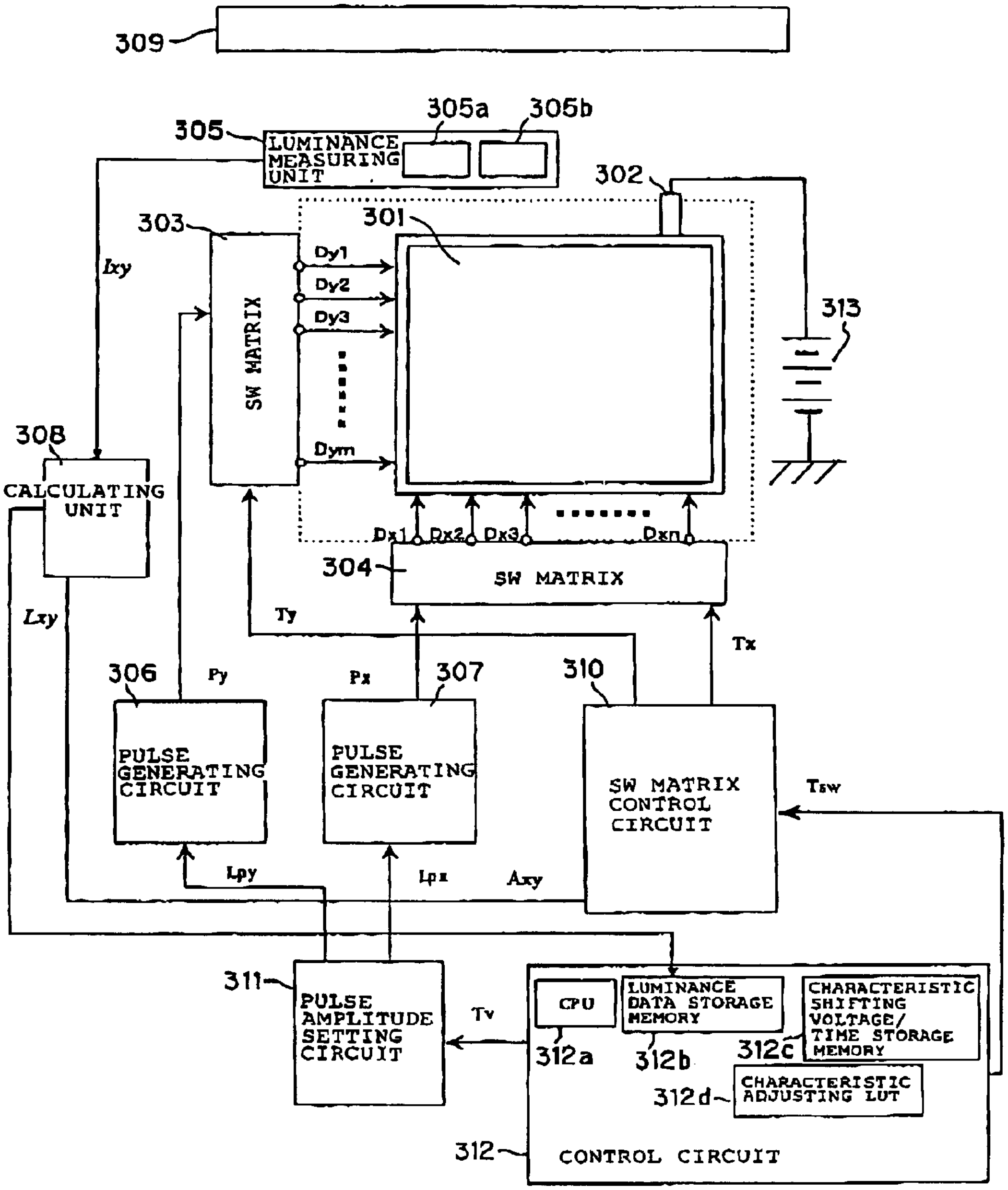
FIG. 1 a schematic block diagram of a unit for applying a characteristic adjusting signal to an image display apparatus employing a multi-electron source according to a first embodiment of the present invention.
Figure 2:
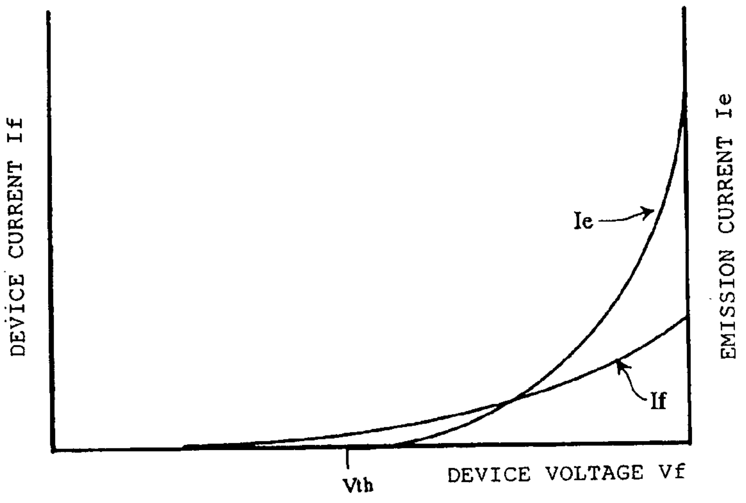
Fig.2 PRIOR ART
FIG. 2 is a graph showing an example of characteristics of a SCE device.

Referring to the drawings, preferred embodiments of the present invention are illustratively described in detail. However, dimensions, material, configuration, and the relative positions of the components are not limited to those stated in the embodiment, unless otherwise specified.

First Embodiment

A method of measuring luminance of an image display apparatus, a method of manufacturing the same, and a method and an apparatus for adjusting characteristics of the same according to a first embodiment of the present invention will be described. In this embodiment, an image display apparatus employing SCE devices as a multiple electron beam source will be described.

Figure 15:
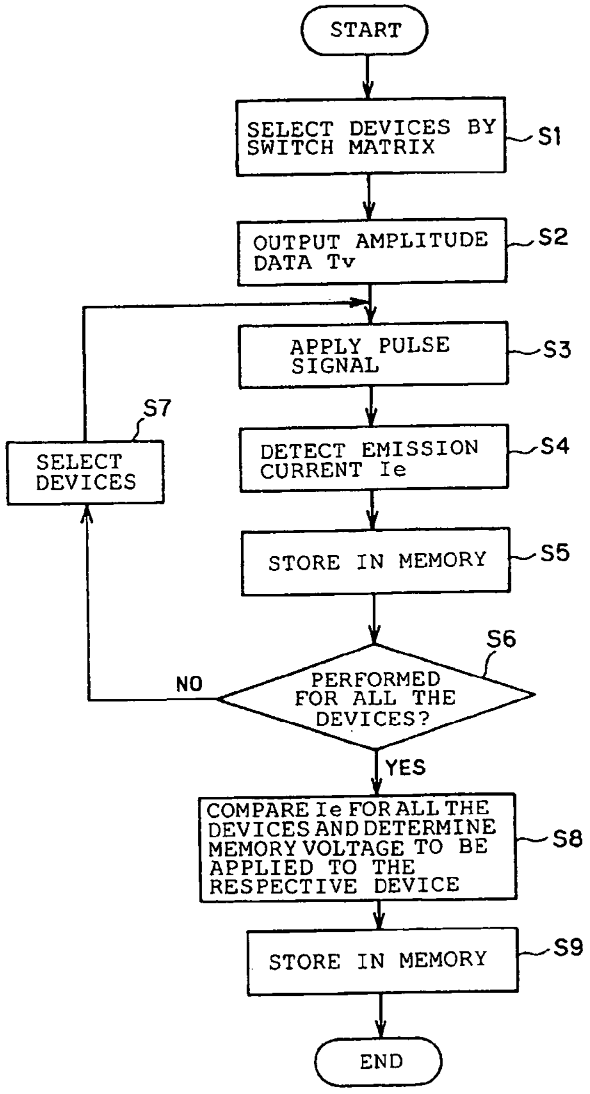
Fig.15 PRIOR ART
FIG. 15 is a flowchart of the characteristic measuring process in the method of adjusting the characteristics according to the related art.
Figure 16:
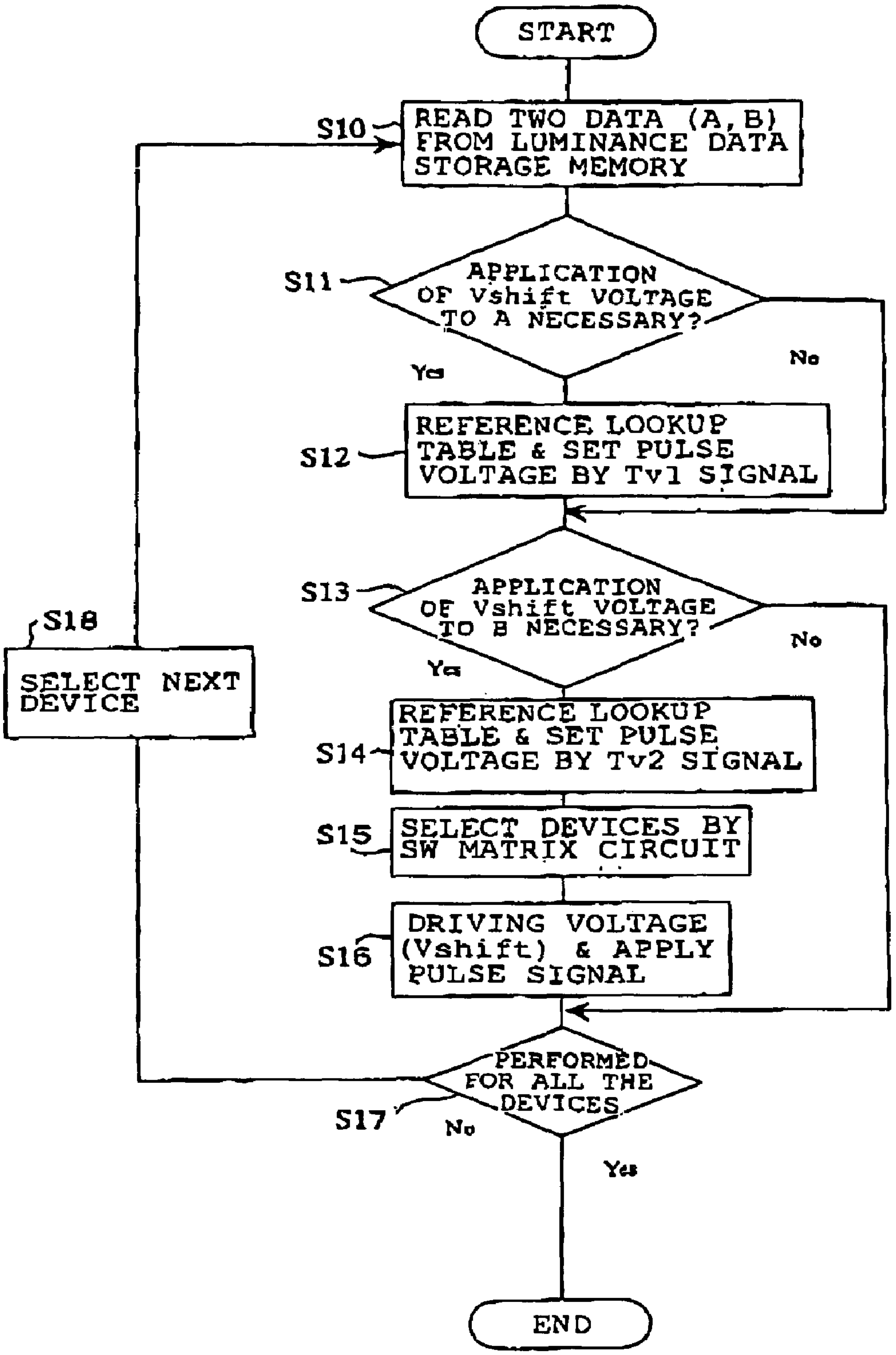
FIG. 16 is a flowchart showing the process of applying a characteristic adjusting signal according to the fourth embodiment of the present invention.

The general construction of the image display apparatus will not be described since it is described in detail in Document 1, with referring to FIG. 15 and FIG. 16.

The inventors of the present application found that performing a preparative driving process in the manufacturing process prior to driving for normal display could reduce a change over time.

In this embodiment, since the preparative driving process and characteristic adjustment of an electron source are performed in series, the preparative driving process will be described now.

Generally, the device applied with a forming process and an energization activation process 1*a* maintained in a stable state in which an organic partial pressure is reduced.

An energization process to be performed prior to preparative driving for displaying an image in such a vacuum atmosphere in which the organic partial pressure is reduced (stable state) is the preparative driving.

In other words, after having operated at a preparative driving voltage Vpre for a certain period, the normal display driving is performed with such normal driving voltage Vdrv that the electric field strength is lowered.

In this manner, it is considered that when applying a large electric field to an electron-emitting unit of the device in advance by driving with Vpre voltage, variations in structure components which may cause instability of characteristics over time are appeared in a concentrated manner in a short time, and the causes of variations that may appear during a long term driving at the normal driving voltage Vdrv which is a low electric field can be reduced.

In this embodiment, the light-emitting characteristics of the respective electron-emitting devices at the normal driving voltage Vdrv for displaying an image is measured prior to usage of electron-emitting devices in the image display apparatus, and when variations in light-emitting characteristics exist, the characteristics of the respective devices are adjusted so that variations are reduced and uniform distribution is achieved.

FIG. 1 is a block diagram showing a construction of a driving circuit for adjusting the electron-emitting characteristic of the electron-emitting devices according to the first embodiment of the present invention. In this embodiment, adjustment of the characteristics of the respective devices may be performed by changing the electron-emitting characteristics by applying a waveform signal fox adjusting the characteristics on the respective SCE devices of a display panel 301.

In FIG. 1, reference numeral 301 designates the display panel and is constructed of a vacuum vessel in which a substrate on which a plurality of SCE devices are arranged into a matrix, and a faceplate or the like is disposed above the substrate at a distance and a fluorescent material that emits light by an electron emitted from the SCE device.

The respective devices provided on the display panel 301 are applied with the above-described preparative driving voltage Vpre prior to adjustment of the characteristics.

Reference numeral 302 designates a terminal for applying a high voltage from a high-voltage power source 313 to the fluorescent material provided on the display panel 301.

Reference numerals 303 and 304 designate switch matrices for selecting an electron-emitting device to be applied with a pulse voltage by selecting a row wiring and a column wiring.

Reference numerals 306 and 307 designate pulse generator for generating pulsed waveform signals Px and Py for driving.

Reference numeral 305 designates a luminance measuring unit for photoelectrically sensing light emitted from the image display apparatus, and includes an optical lens 305*a* and an area sensor 305*b*. In this embodiment, a CCD is employed as area sensor.

The state of light emitting of the image display apparatus may be electronized (i.e. converted to electronic form) as two-dimensional image information using the luminance measuring unit 305 (optical system).

Reference numeral 308 designates a calculating unit.

Two-dimensional luminance signal Ixy which is an output of the area sensor 305*b* and a positional information signal Axy designated to the switch matrixes 303. 304 are supplied from a switch matrix control circuit 310 to the calculating unit 308. The calculating unit 308 calculates Information on the light-emitting amount corresponding to each driven SCE device, and outputs the result to a control circuit 312 as Lxy. This method will be described in detail later.

Reference numeral 309 designates a robot system for moving the area sensor 305*b* with respect to the panel. The robot system 309 is provided with a ball screw and a linear guide, not shown.

Reference numeral 311 designates a pulse amplitude setting circuit, which sets the amplitudes of the pulse signal outputs from the respective pulse generators 306, 307 by supplying pulse setting signals Lpx and Lpy.

Reference numeral 312 designates a control circuit for controlling the general characteristic adjustment flow and supplying data Tv for setting the amplitude to the pulse amplitude setting circuit 311. Reference numeral 312*a* designates a CPU for controlling the operation of the control circuit 312.

Reference numeral 312*b* is a luminance data storage memory for storing the light-emitting characteristics of the respective devices for adjusting the characteristics of the respective devices.

More specifically, the memory 312*b* stores light-emitting data which is proportional to the light-emitting luminance for the light emission by the electrons emitted from the respective devices when being applied with the normal driving voltage Vdrv.

Reference numeral 312*c* is a memory for storing a characteristic shifting voltage required for equalizing the characteristics of the device with target values.

Reference numeral 312*d* designates a look-up table (LUT) to be referenced when adjusting the characteristics of the devices, and the detailed description will be made later.

Reference numeral 310 designates the switch matrix control circuit for selecting the electron-emitting devices to which the pulsed voltage is applied by supplying switching signals Tx. Ty and controlling the selection of the switch of the switch matrixes 303, 304.

The switch matrix control circuit 310 outputs address Information Axy indicating which device is turned ON to the calculating unit 308.

The operation of the driving circuit will now be described.

The operation of the driving circuit may be roughly divided into a step of measuring the light-emitting luminance of the respective devices of the display panel 301 and obtaining information on variations in luminance required for achieving the target value of adjustment, and a step of applying a pulsed waveform signal for shifting the characteristics so as to achieve the target value of adjustment.

A method of measuring the light-emitting luminance will be described now. In a first place, the luminance measuring unit 305 is moved to the position opposing the display panel to be measured by the robot system 309. Then, the switch matrixes 303, and 304 select a predetermined row wiring or a column wiring through the switch matrix control circuit 310 by a switch matrix control signal Tsw from the control circuit 312 to switch so that the SCE devices of the desired address can be driven.

On the other hand, the control circuit 312 outputs amplitude data TV for measurement of the electron-emitting characteristics to the pulse amplitude setting circuit 311. Accordingly, the amplitude data Lpx and Lpy are supplied from the pulse amplitude s tting circuit 311 to the pulse generators 306, 307, respectively.

Based on the amplitude data Lpx and Lpy, the respective pulse generators 306 and 307 output the driving pulses Px and Py, and the driving pulses Px and Py are applied to the devices selected by the switch matrixes 303 and 304.

Now, the driving pulses Px and Py are preset so as to have amplitude of one half the voltage Vdrv to be applied to the SCE devices for measuring the characteristics and to be pulses having opposite polarities with respect to each other.

Simultaneously, a predetermined voltage is applied to the fluorescent material of the display panel 301 by the high-voltage power source 313.

The step of selecting the address and the step of applying pulses are repeated for the plurality of row wirings and then the SCE devices are driven, while scanning the area (for example, square area) on the display panel.

A signal Tsync indicating the duration of repetition of these steps is supplied to the area sensor as trigger of an electron shutter.

Figure 4:
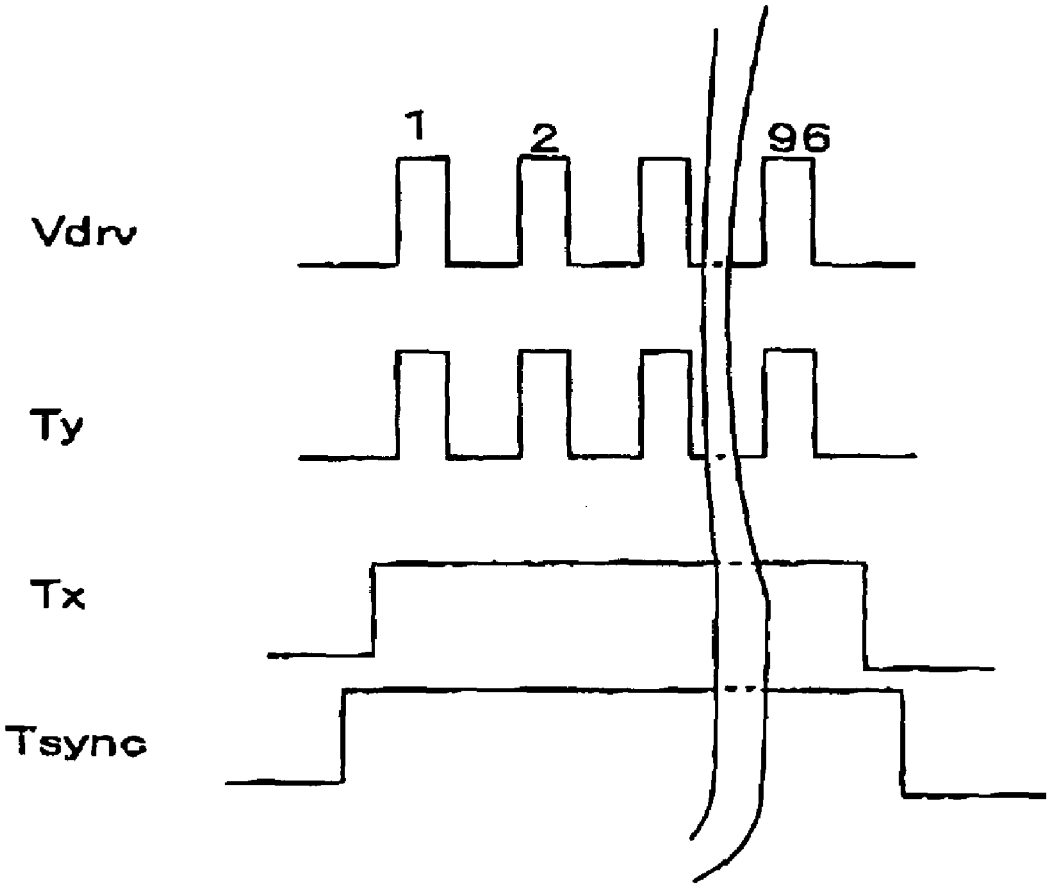
FIG. 4 is a timing chart showing a timing of driving of the characteristic adjusting apparatus according to the first embodiment of the present invention.

In other words, the control circuit 312 Outputs the driving signal Vdrv synchronously with the switching signals Tx, Ty as shown in FIG. 4, and outputs Ty signals by the number corresponding to the row wirings to be scanned in sequence. Taync signals are supplied so as to wrap the plurality of Ty signals.

Figure 5:
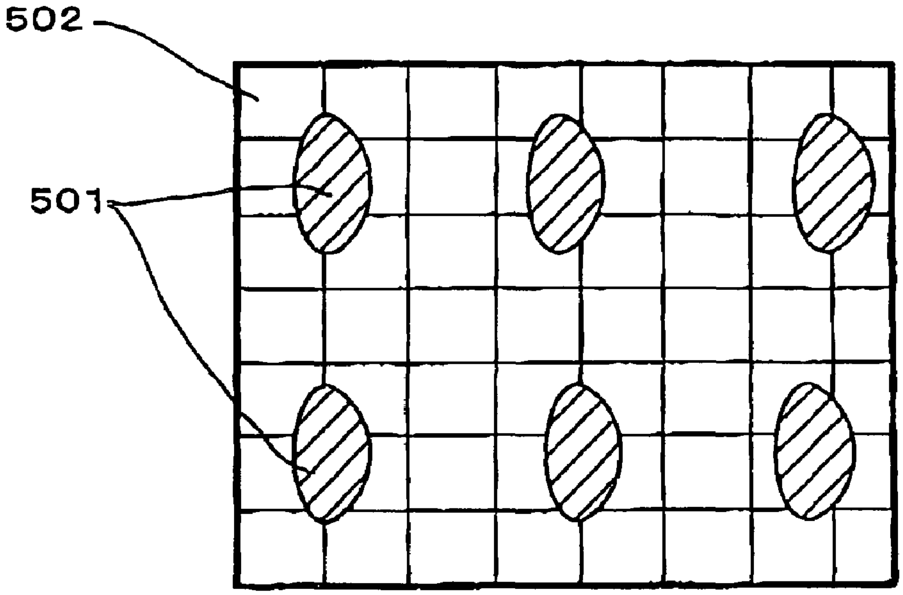
FIG. 5 is a diagram showing a state in which luminescent spots on an image display apparatus according to the first embodiment of the present invention are projected on an area sensor.

The shutter of the area sensor 305*b* is opened while the Tsync is in logical High, a reduced illuminated image is formed through the optical lens 305*a* on the area sensor 305*b*, which is schematically shown in FIG. 5.

The rate of reduction of the optical system is determined so that an image of one light-emitting point 501 is formed on a plurality of elements of area sensors 502.

A luminance signal Ixy of the picked up image is transferred to the calculating unit 308. Since the images of the driven devices are formed, the luminance value proportional to the light-emitting amount of the driven device may be obtained by adding luminance of the allocated elements of the sensor.

In this manner, since the luminance value corresponding to the driven devices of the area may be obtained, information is transmitted to the control circuit 312 as luminance data Lxy.

Although the electron shutter is opened during after-glow period of the fluorescent material, since the light-emitting points are spatially isolated on the area sensor from each other, influence of the after-glow period did not occur between the light-emitting points.

Figure 3:
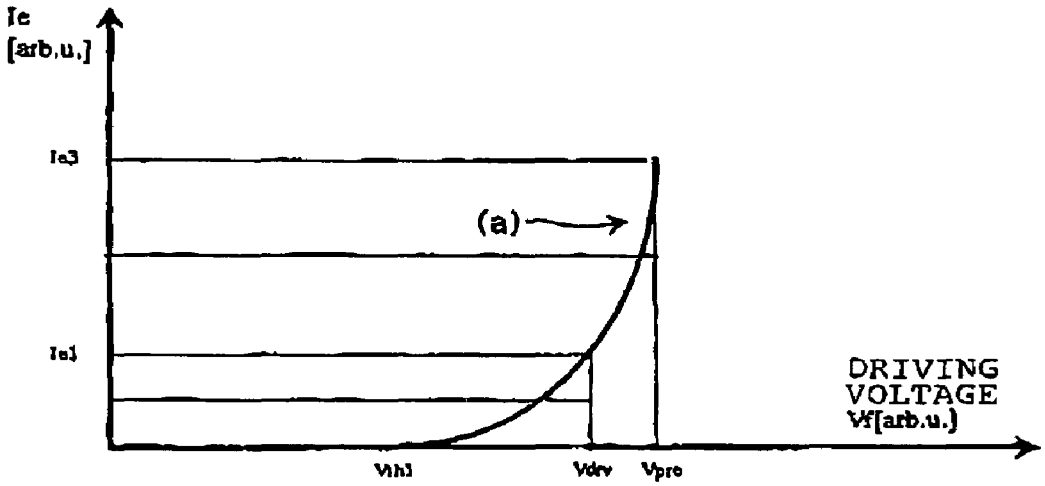
FIG. 3 is a graph showing an example of the emission current characteristics when the driving voltage applied on the respective SCE devices which are applied with a preparative driving voltage has changed.
Figure 6:
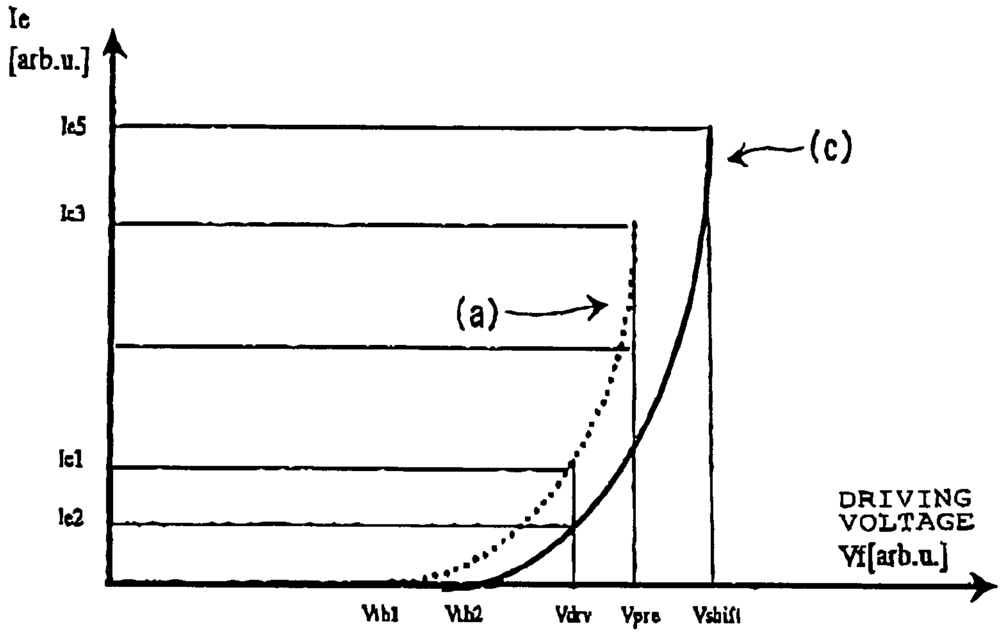
FIG. 6 in a drawing showing a change in emission current characteristics when a characteristic shifting voltage is applied on a device having the emission current characteristics shown in FIG. 3.

Referring now to FIG. 3 and FIG. 6, a method of adjusting the characteristics employed in this embodiment will be described schematically.

FIG. 3 is a graph showing an example of variations in emission current Ie when a driving voltage (amplitude of the driving pulse) Vf of the SCE device, which constitutes a multi-electron source of the display panel 301 according to this embodiment has changed after being applied with the preparative driving voltage Vpre.

The electron-emitting characteristic is indicated by a performance curve (a), and the emission current at the driving voltage Vdrv is Iel.

The SCE devices according to this embodiment have the emission current characteristics corresponding to the maximum amplitude or the pulse width of the driving pulse applied in the past (memory function).

FIG. 6 shows a change of the emission current characteristics when a characteristic shifting voltage Vshift (Vshift≧Vpre) is applied to the device having the emission current characteristic (a) shown in FIG. 3 (curve (c) in FIG. 6).

It shows that application of the characteristic shifting voltage reduces the emission current Ie at the moment when the Vdrv is applied from Ie1 to Ie2. In other words, application of the characteristic shifting voltage shifts the emission current characteristic toward the right (to the direction in which the emission current is reduced).

Since the light-emitting amount with respect to the emission current is determined by an accelerating voltage of the electron toward the fluorescent material, the light-emitting efficiency, and the current density characteristics of the fluorescent material, the light-emitting characteristics can be shifted by referencing the amount which takes those into account in advance.

The magnitude of the voltage to be applied to the electron-emitting device in each step is set as follows.

Where the driving voltage for measurement to be applied in the step of measuring the light-emitting characteristics of each electron-emitting device is represented by VEmeasure, the characteristic shifting voltage to be applied in the step of adjusting the characteristics of the respective electron-emitting devices to be uniform is represented by Vshift, and the maximum value of the driving voltage to be applied when using the electron-emitting device for displaying an image is represented by Vdrive, the relation between these values and the aforementioned Vpre satisfies the relation;

Vdrive≦VEmeasure≦Vpre≦Vshift

In this manner, by setting the VEmeasure to a value larger than the valu of Vdrive, each electron-emitting device is applied in advance with a voltage larger than the driving voltage to be applied when being used prior to usage. Therefore, such disadvantage that the electron-emitting characteristics is shifted during usage may be prevented.

Since the value of Vshift is set to a larger value than VEmeasure, the characteristic shifting pulse applied to the electron-emitting device is the maximum voltage.

Therefore, when the characteristic shifting pulse is applied, the electron-emitting characteristics may be reliably shifted to the-desired characteristics. As a matter of course, since the Vshift is set to a value larger than Vdrve, the electron-emitting characteristics, which are adjusted to be uniform, are prevented from being shifted during usage.

Here, the relation between the electron-emitting amount from the device and the luminance is determined by the accelerating voltage and the current density of the electron and the light-emitting characteristics of the fluorescent material. Therefore, in order to know how much the characteristic curve is shifted rightward by applying how much magnitude of the characteristic shifting voltage is applied to the electron-emitting device having certain initial characteristics, it is necessary to measure luminance in advance by applying various magnitudes of Vshift to the electron-emitting devices having various initial characteristics.

Therefore, such data obtained from experiments is stored in the control circuit 312 as the lookup table 312*d* in advance.

The magnitude of the characteristic shifting voltage to be applied to each electron-emitting device is selected by referencing the lookup table 312*d*.

In this embodiment, an optical system and a robot system are designed so that measurement can be performed by dividing the area on the display panel into 80 block visual fields, that is, ten-by-eight blocks in the vertical and lateral directions.

In the faceplate of the display panel according to this embodiment, as shown in FIG. 7A, a fluorescent material of one color-one pixel is set to 155 μm×300 μm. the width of a vertical black stripe is set to 50 μm, and the width of a lateral black strip is set to 300 μm. Therefore in case of 3×1280×768 pixels, the display area is about 790 mm×460 mm. FIG. 7B shows a construction of a rear plate having the SCE devices and the row wirings and the column wirings disposed on a substrate corresponding to the fluorescent material and the black stripes on the faceplate. In this example, the widths of the column wiring and the row wirings are set to match the widths of the vertical and lateral black stripes on the faceplate.

Therefore, the robot system is designed so that the specific area can be scanned, and the magnification of the optical system was set to 0.18 times.

Figure 8:
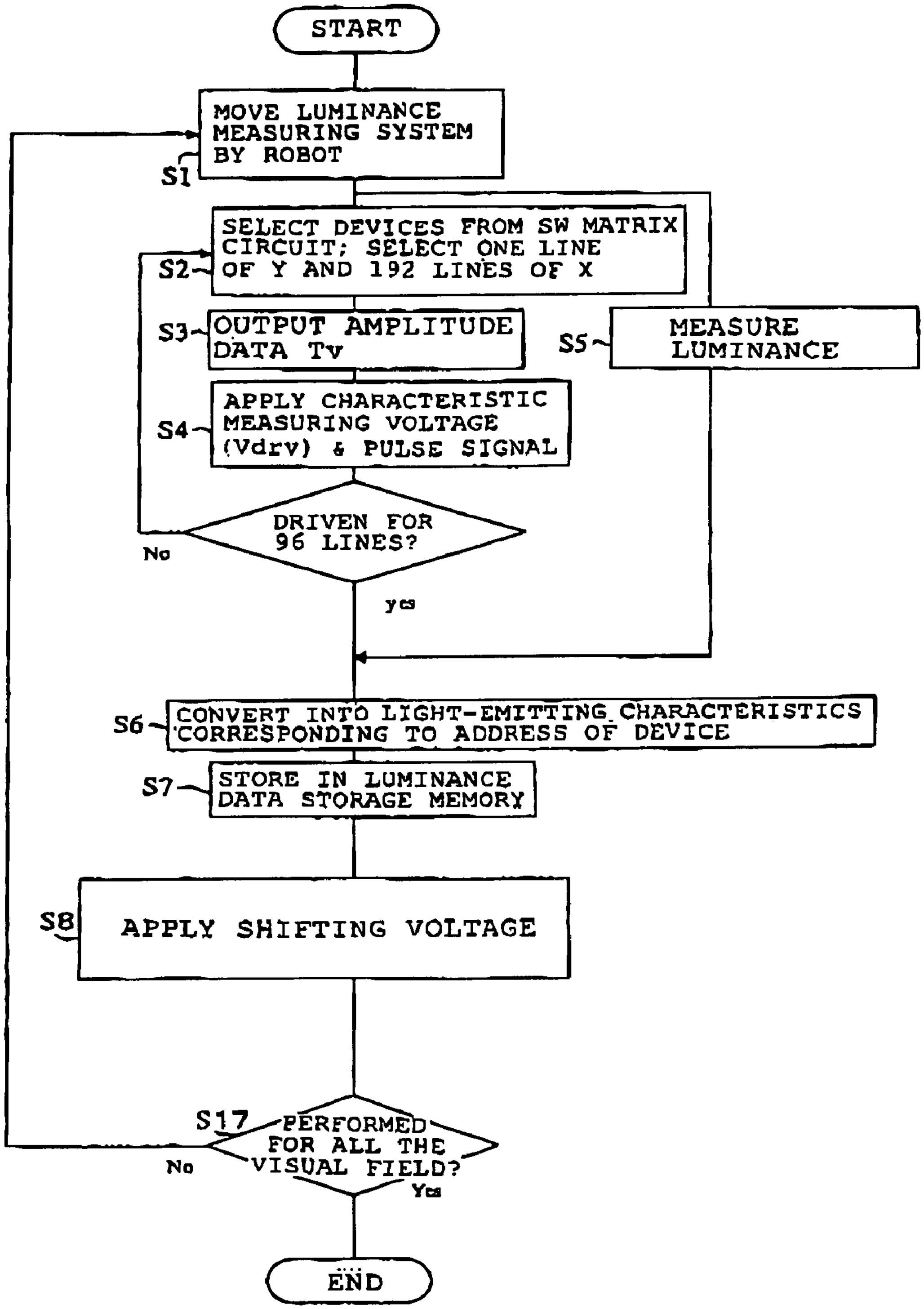
FIG. 8 is a flowchart showing a characteristic adjusting process of the respective SCE devices in the electron source according to Example 1.

FIG. 8 is a flowchart showing the characteristic measuring process according to the control circuit 312.

In step S1, the optical system is moved to a desired visual field (area).

In step S2, the switch matrix control signal Tsw is supplied and the switch matrixes 303 and 304 are switched by the switch matrix control circuit 310. Then, 192 (half the 384 devices in a row) SCE devices which are not adjacent to each other are selected from the display panel 301.

Subsequently, in step S3, the amplitude data Tv of the pulse signal to be applied to the selected devices is supplied to the pulse amplitude setting circuit 311.

The amplitude of the pulse for measurement is the driving voltage Vdrv used when displaying an image. In step S4, pulse signals for measuring the characteristics of the electron-emitting devices are applied to the SCE devices selected in step S1 by the pulse generators 306 and 307 via the switch matrixes 303 and 304.

The procedure from the step S2 to the step S4 is repeated 192 (96 column×2) times while changing the row wiring and the column wiring to be designated in sequence. Simultaneously with those steps, a light-emitting image in the driven area is measured in step S5.

Subsequently, in step S6, luminance is converted based on the light-emitting images and the addresses of the driven devices into luminance values corresponding to the addresses of the devices. In other words, 96×384 devices are driven and the luminance values thereof were obtained.

Then, in step S7, the obtained luminance data is stored in the memory 312*b*.

Then, based on the obtained luminance data, the shifting voltage applying process is performed In step S8. The detailed description of this step will be described later. The shifting voltage applying process for one visual field is now completed.

In step S17, whether or not measurement of luminance and the shifting voltage applying process has conducted for all the visual fields on the display panel 301 is inspected. If not, the procedure goes to the step S1, and the optical system is moved to the next visual field to repeat the procedure.

The robot system 309 was used for moving the optical system, and the speed of movement of the luminance measuring system was 30 mm/sec.

Since dimensions of one visual field are about 80 mm×60 mm, time required to move from one visual field to the next were about four seconds.

In this embodiment, Vdrv was 14 volts, Vpre was 16 volts, Vshift was 16-18 volts, the pulse used for shifting the characteristics was a short pulse of 1 ms width and 2ms cycle, and the pulse used for measuring luminance was a pulse of 18 μs width and 20 μs cycle.

Since the number of pulses output when measuring the luminance value of the entire display is 192 per visual field, the number of visual fields is 80, and the number of pulses se 15360 in total, Therefore, driving time was about 0.3 second, and time required for movement was in the order of 320 seconds from 4 (sec.) times 80 (visual field).

Duration of application of the shifting voltage was about 5900 seconds from 2 rs×total number of devices.

Figure 9:
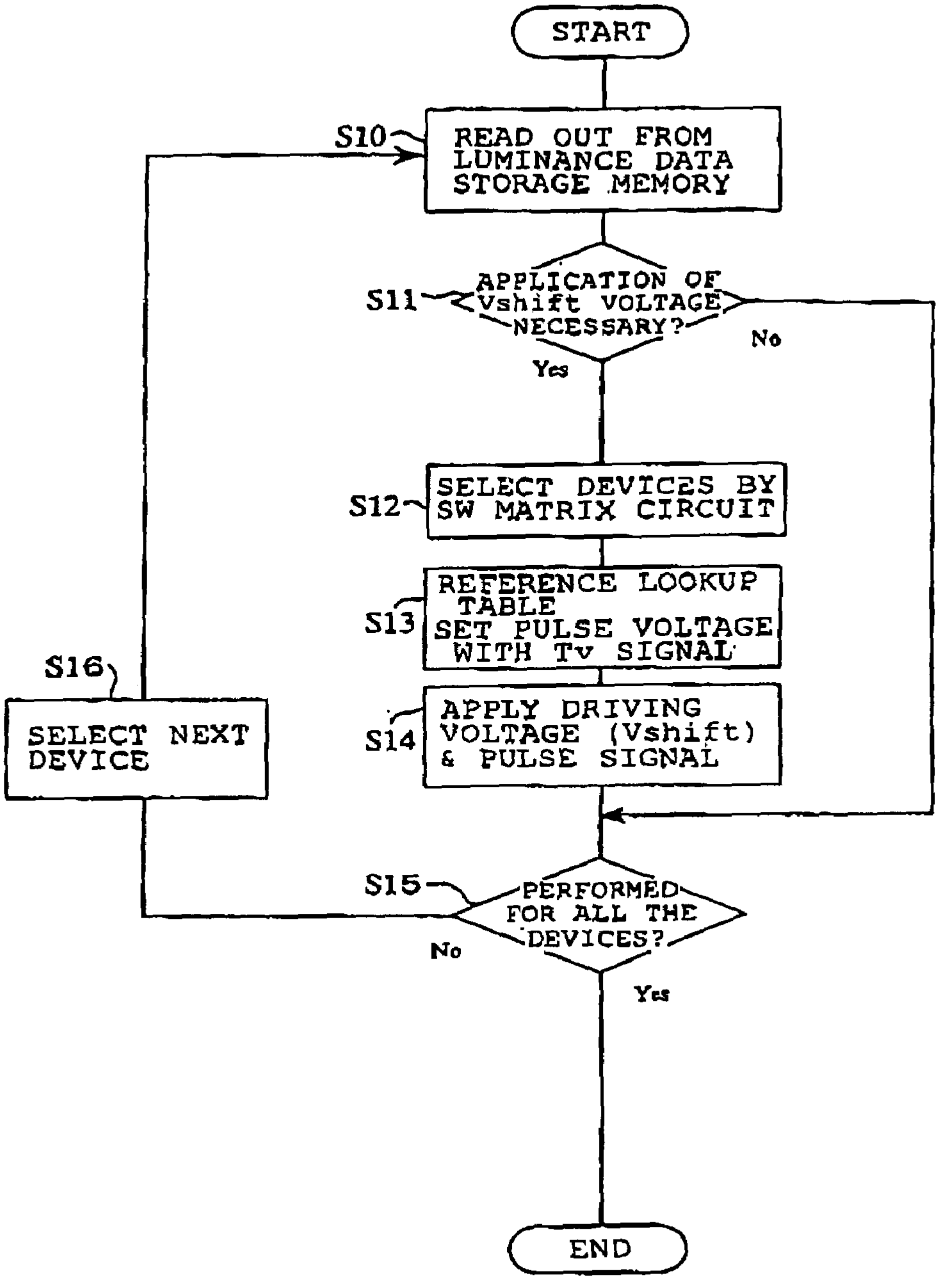
FIG. 9 is a flowchart showing a process of applying a characteristic adjusting signal based on the measured electron-emitting characteristics.

FIG. 9 is a flowchart for the process of bringing the luminance valu of the SCE devices in one visual field on the display panel 301 into agreement with the preset target value performed by the control circuit 312 according to this embodiment, which corresponds to the step S8 in the flowchart in FIG. 8.

In step S10, the measured luminance value is read out from the memory 312*b*.

Subsequently, In step S11, whether or not it is necessary to apply the characteristic shifting voltage on the respective SCE devices, that is, the relation of magnitude with respect to the target luminance value is determined.

When it is determined that application of the shifting voltage is necessary, as in step S12, data of the device of which the initial characteristics are the closest to the specific device is read from the lookup table 312*d*.

Then, from the specific data, the characteristic shifting voltage for equalizing the characteristics of the specific device with the target values is selected from the data.

Subsequently, in step S13, the switch matrixes 303 and 304 are controlled by the switch matrix control signal Tsw via the switch matrix control circuit 310, and one of the SCE devices of the display panel 301 is selected.

Then, the pulse amplitude setting circuit 311 sets the amplitude of the pulse signal with the amplitude setting signal Tv, and in step S14, the pulse amplitude setting circuit 311 outputs the amplitude data Lpx and Lpy and the pulse generators 306 and 307 output the driving pulses Px and Py of the set amplitude based on the supplied value.

In this manner, the values of characteristic shifting voltage are determined for the respective devices, and the SCEs which are required to shift the characteristics are applied with the characteristic shifting pulse according to the characteristics thereof.

In step S15, whether or not the process has finished for all the SCEs in one visual field is investigated, and if not, the procedure goes back to the step 10.

When the image display apparatus manufactured according to the steps described above is driven with a Vdrv of 14 volts, and the variations in luminance over the entire surface are measured, the standard deviation/average was 3%. When moving images are displayed on the panel, a high-quality image could be displayed without feeling of fluctuations.

COMPARATIVE EXAMPLE

The electron-emitting characteristics of the image display apparatus fabricated in the same manner as that described above other than the point the adjacent electron-emitting devices are selected instead of the procedure in the first embodiment were adjusted.

As a consequence, points where partial display performance is deteriorated were found in the area. When having observed those points, they were the areas where the light-emitting points were superimposed at several adjacent portions.

It is easy to understand that there may be difference between the quality of image displayed in the case of the comparative example and the quality of image in the case where the "devices that are not adjacent to each other" are selected as in the first embodiment by supposing that another light-emitting point exists between two light-emitting points 501 in FIG. 5.

Second Embodiment

While the case in which pixels that are not adjacent to each other are selected and illuminated simultaneously for measuring luminance of the pixels has been described in the first embodiment a case in which the "pixels that are not adjacent to each other" to be selected are the same color selected from the three primary colors (red R. green G. and blue B) will be described in this embodiment.

Since the basic construction and the operation are the same as in the first embodiment, the description will not be made again.

In the method of measuring luminance in the first embodiment, the object to be measured was a color image display apparatus having a pixel construction in which the pixels displaying R, G, and B are disposed adjacently with respect to each other, and those pixels were illuminated in a time-sharing manner for each of R, G and B so that the devices that are not adjacent to each other were simultaneously selected. Then the characteristic adjustment was performed in the same manner as in the first embodiment.

Figure 12:
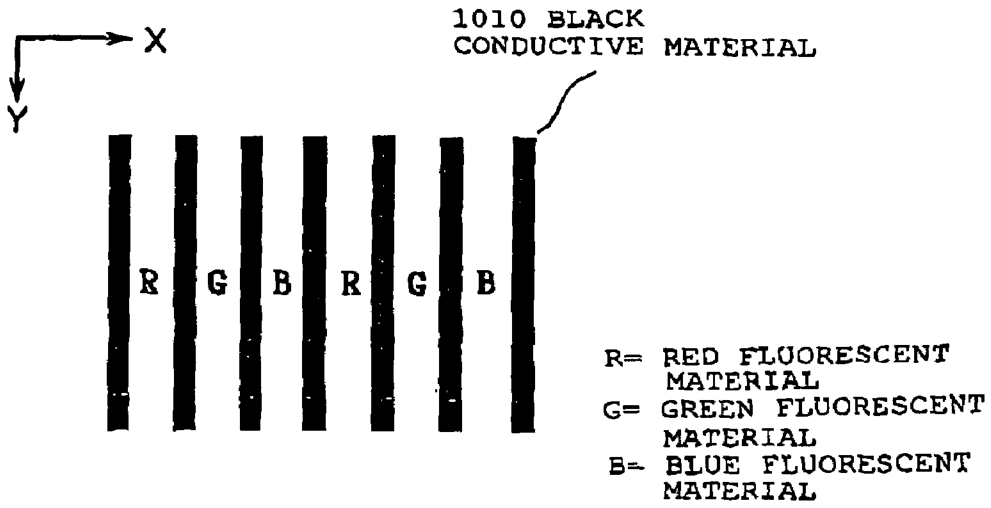
FIG. 12 is a plan view showing an example of the arrangement of the fluorescent materials on the faceplate in the display panel according to the embodiment.

In other words, in the color image display apparatus according to this embodiment, as shown in FIG. 12, the fluorescent materials in red, green, and blue are disposed an the faceplate in this order. Therefore, by selecting the pixels in the same color, the pixels that are not adjacent to each other are selected consequently.

Therefore, in this embodiment, luminance of the pixels of each color are measured with intervals from each other and, as described in the first embodiment, the measuring time is shortened, and accuracy of measurement is improved.

In this embodiment, instead of selecting the row wirings row-by-row in sequence in one block and measuring luminance of the pixels of each color in a time-sharing manner, it is also possible to select all the row wirings in one block simultaneously and measure the luminance for each color. In other words, by performing the illuminating operation three times in total for each of R, G, and B for the SCE devices in one block, luminance of all SCE devices in the block can be measured. In this case, in comparison with the case in which measurement is made for every row, the measuring time can significantly be shortened.

In this case, although the devices that are adjacent with each other are illuminated simultaneously in the column direction, disposition of lateral black stripes as described above will sufficiently prevent influence of the adjacent pixel on the measurement of luminance.

The method of adjusting the electron-emitting characteristics based on measured luminance is as described in the first embodiment.

However, in this embodiment, measurement of luminance in R/G/B basis and the adjustment of the characteristics to the target values by characteristic shifting operation are performed while taking the white balance characteristic in the display unit into account.

In other words, in addition to the adjustment of the electron-emitting characteristics of the electron-emitting devices from luminance data of each device In each color so that the distribution of luminance is uniformalized, according to this embodiment, the electron-emitting characteristics of the electron-emitting devices are adjusted from luminance data of each color so that the suitable white balance is achieved.

As a consequence, image display having a suitable white balance in addition to variations in luminance in the same extent as the first embodiment was obtained.

As described above, in measurement of luminance of the image display apparatus, measurement of luminance with a high degree of accuracy was achieved by eliminating influence from the adjacent pixels, which display other colors.

In addition, by applying the above mentioned method to the characteristic adjusting process for the multi-electron source, irregular variations in electron-emitting characteristics of the respective electron-emitting devices, variations in fluorescent (light-emitting) characteristics of the fluorescent materials, and variations in luminance caused by the construction of the image display apparatus may be suppressed, and thus manufacture of an image display apparatus with high display quality was achieved.

In addition since the adjustment process could be performed at high speed because the light-emitting characteristics of the plurality of devices can be obtained simultaneously, the process time required for adjusting the characteristics could be significantly shortened.

Third Embodiment

In this embodiment, when selecting the devices to be driven and measured in the first embodiment, the devices that were not adjacent to each other in a certain row and a plurality of rows that were not adjacent to each other were selected simultaneously, and were illuminated separately for R, G, and B for measuring luminance.

When the characteristics were adjusted in the same manner as the second embodiment except for the point described above, the same image display as in the second embodiment was achieved, According to this embodiment, since the tolerance of accuracy of alignment of measuring equipment and of panel dimensions could be widened, and correction of sensitivity of the measuring equipment could be achieved at once, the measuring operation could advantageously be simplified.

Fourth Embodiment

In the first embodiment, the construction in which measurement of luminance is performed by moving a single luminance measuring unit over the entire area of the panel was described.

In this embodiment, a construction in which a plurality of luminance measuring units (four, in this example) are provided for enabling simultaneous measurement with the plurality of luminance measuring units so that the measuring time is further shortened will be described.

Since other basic constructions are the same as the first embodiment, the same constructions are represented by the same reference numerals, and will not be described again. It is also possible to apply this embodiment to the second and the third embodiment.

Figure 10:
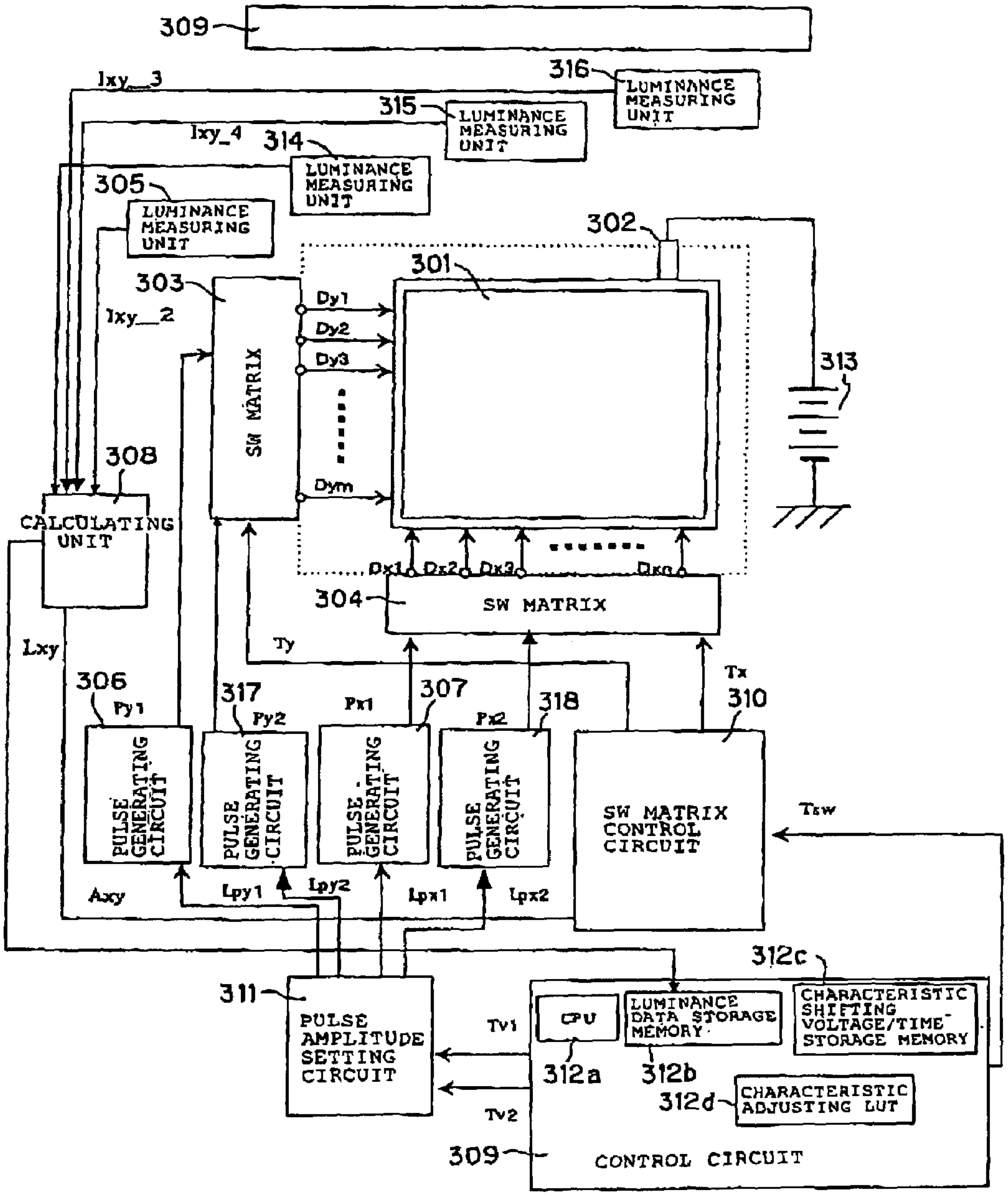
FIG. 10 is a schematic block diagram showing a unit for applying a characteristic adjusting signal according to a fourth embodiment of the present invention to the image display apparatus employing the multi-electron source.
Figure 11:
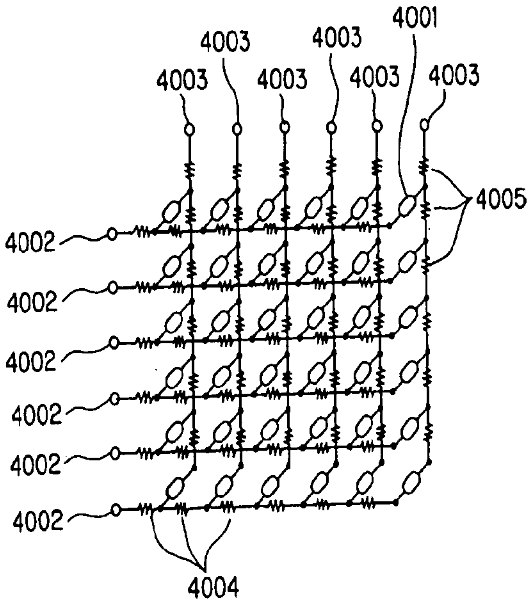
Fig.11 PRIOR ART
FIG. 11 is an explanatory drawing showing a matrix wirings of the multi-electron source according to the related art.

FIG. 10 is a block diagram showing a construction of a driving circuit for adjusting the electron-emitting characteristics of the electron-emitting device according to the fourth embodiment of the present invention.

The number of the luminance measuring units is increased by three compared with the construction shown in FIG. 1 in the first and the second embodiments, and thus four in total of the luminance measuring units (305, 314, 315, 316) are provided. In association With it, the number of pulse generating circuits is increased by two, that is, four pulse generating circuits 306, 307, 317, 318 are provided.

In this embodiment, by providing four visual fields to be selected at once, increase in speed of measurement of luminance is achieved.

Figure 13:
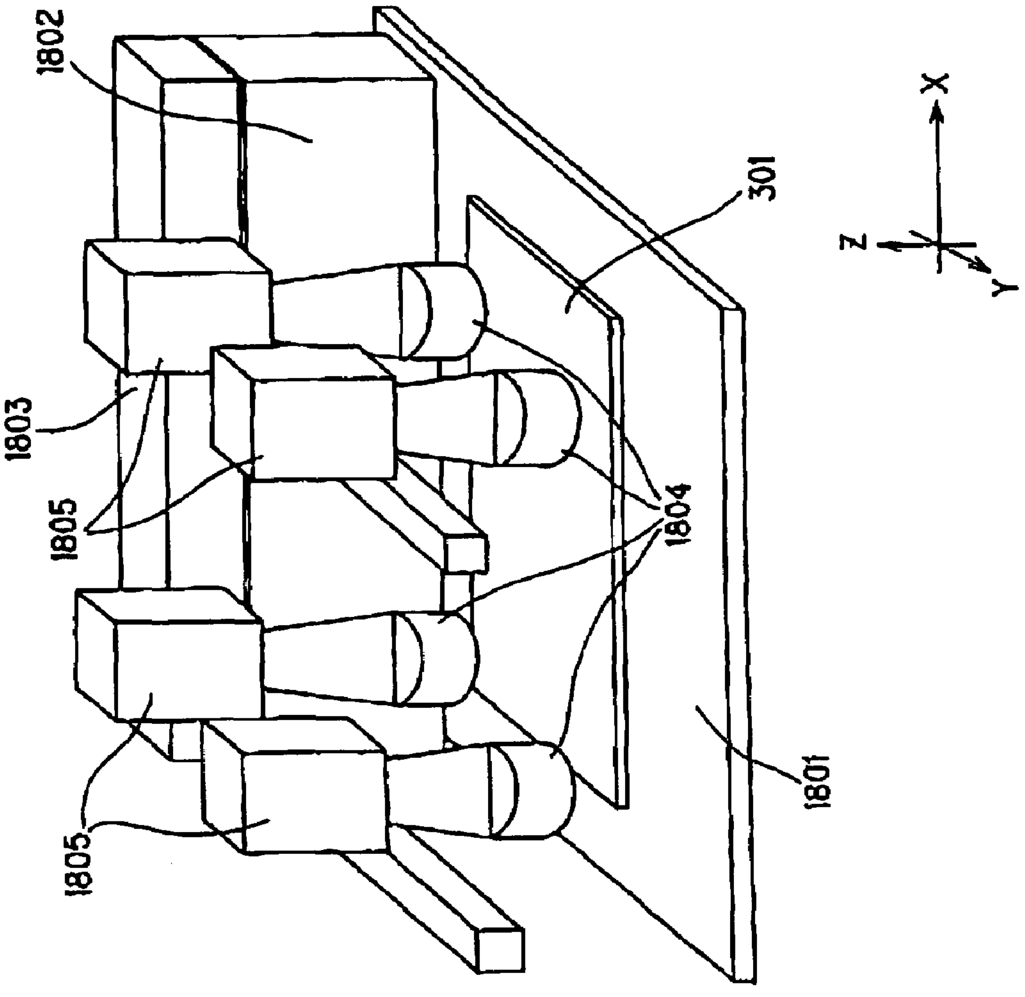
FIG. 13 is a perspective view showing a construction of a characteristic adjusting apparatus according to the fourth embodiment of the present invention.

As shown in a block diagram in FIG. 13, the display panel 301 is placed on a stage 1801, and a robot system 1803 for moving the optical system in the X-Y direction is placed on the base 1802.

Four sets of optical systems (luminance measuring units), including a lens 1804 and a CCD camera 1805, are arranged.

Since the overall flow is the same as the first to third embodiments shown in FIG. 8, different parts are mainly described below.

Figure 14:
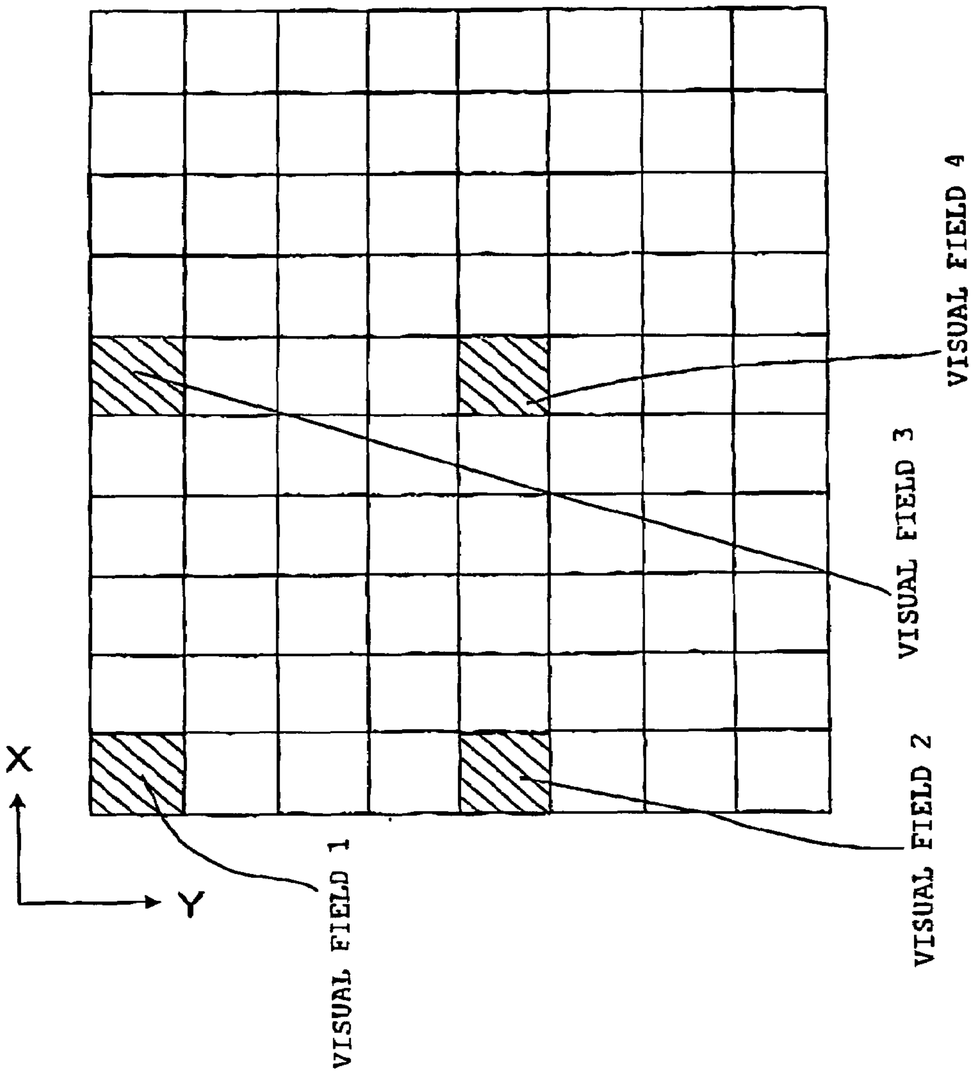
FIG. 14 is a block diagram showing positions of visual fields preset to the image display apparatus according to the fourth embodiment of the present invention.

In step S1, two luminance measuring units (luminance measuring system, optical system) are moved to two of visual field 1, visual field 2, visual field 3, and visual field 4 as shown in FIG. 14.

In step S2, 768 SCE devices are selected.

For example, when one of the plurality of visual fields is selected, the operation will be such that the devices that are not adjacent to each other: Y=1, Y=385. X=1-384, X=1921-2304: are selected so that the switches of these devices are turned ON.

Subsequently, in step S3, amplitude data Tv1, Tv2 of the pulse signal to be applied to the s lected devices is supplied to the pulse amplitude setting circuit 311. Then, in step S4, pulse signals for measuring the characteristics of the electron-emitting devices are applied to the SCE devices selected in step S1 by the pulse generating circuits 306, 307, 317, and 318 via the switch matrixes 303 and 304.

Therefore, 768 devices in total including Y=1, Y=365, X=1-384, X=1921-2304 are simultaneously driven.

Then the procedure from the step S2 to the step S4 is repeated by 192 time awhile shifting the row wiring (Y) to specifying sequence.

With this operation, four areas (square area, square region) Including Y=1-96, Y=385-480, X=1-384, X=1921-2304 are illuminated.

The synchronous signals Tsync which are synchronous with illumination of these areas are supplied from the control circuit 312, and the electron shutter is opened based on the signals. Accordingly, the light-emitting images in the driven areas are measured in step S5.

The voltage to be applied to each block in this case will be described.

In FIG. 14, a voltage is applied to the shadowed blocks, which are duplicated areas of the areas selected in the X direction and in the Y direction.

Since the characteristics of the devices vary when the shifting voltage is applied to the devices which are not the intended to be adjusted, the following measure was taken to avoid this problem in this embodiment.

Where the voltage applied from the Y-side of the visual fields 1 and 3 is represented by Py1, the voltage applied from the X-side is represented by Px1, the voltage applied from the Y-side of the visual fields 2 and 4 is represented by Py2, and the voltage applied from the X-side is represented by Px2, the voltage of Py1+Px1 is applied to the devices in the visual field 1.

In the same manner, the voltage of Py2+Px1 is applied to th devices in the visual field 2, the voltage of Py1+Px2 is applied to the devices in the visual field 3, and the voltage of Py2+Px2 is applied to the devices in the visual field 4.

Therefore, when measuring luminance, indication signals of Lp1, Lp2, Lp3, and Lp4 are determined so that the respective four voltages Correspond to Vdrv voltage.

Subsequently, in step S6, as in the first embodiment, luminance is converted based on the light-emitting images and the addresses of the driven devices to luminance values corresponding to the addresses of the devices. Consequently, the luminance values of four points at which the 96×384 devices are arranged are obtained.

Referring now to FIG. 16, a process to shift the characteristics will be described.

In this embodiment, two devices in total, that is, one for each of two visual fields, are selected and the shifting voltages are applied thereto.

The reason why the shifting voltage is not applied simultaneously to four devices, one for each of four visual fields, is shown below.

For example, in FIG. 14, when the shifting voltages to be applied on the devices in the visual field 1, the visual field 2, the visual field 3, and the visual field 4 are 16, 15, 15.5. and 16 volt, only the voltages of the above-described combination can be applied to the visual fields, and thus Py1, Py2, Px1, and Px2 cannot be determined.

Even when an attempt is made to select two devices to be applied with the shifting voltage simultaneously from the visual field 1 and visual field 4, the different shifting voltages cannot be applied simultaneously because the voltage is applied also to the visual field 2 and the visual field 3.

In step S10, luminance data of the devices at the addresses corresponding to the visual field 1 and the visual field 3 is read. For the sake of convenience, the specific devices are designated as a device A and a device B. Comparison with the target value is made first for the device A, and necessity of application of the V-shifting voltage is determined.

When application of the shifting voltage is necessary, in step S11, the lookup table is referenced, and the shifting voltage Tv1 is determined. Subsequently, in step S13, necessity of application of the shift voltage for the device B is determined, and Tv2 is determined in step S14.

Subsequently, the amplitude of the pulse is determined using the pulse amplitude setting circuit 311 in FIG. 10. For example, when application of a voltage of 16 Volt as Vpre is necessary for the device A, and of a voltage of 15.5 Volt is necessary for the device S, the voltages Py1. Py2. Px1, and Px2 are set to 8 Volt. 0 Volt, 8 Volt, and 7.5 Volt, respectively.

In this case, since only the voltage below Vdrv is applied to the devices In the visual field 2 and the visual field 4, even wh n the shifting voltage was applied to the device A and the device B simultaneously, there was no influence on the characteristics.

Indicating signals Lp1, Lp2, Lp3 and Lp4 are determined in this manner.

Then, the devices are selected from the visual field 2 and the visual field 4, the shifting voltage application process is performed in sequence.

Subsequently, the device is selected using the voltage setting as described above in step S15, and then the shifting voltage is actually applied In step S16.

The procedure described above is performed for all the devices in the two visual fields, and when it is determined that all the devices are processed in step S17, the procedure is completed.

Time for measuring the luminance value of the entire display was in the order of 160 seconds, which is one-fourth of the first embodiment.

In this embodiment, since-duration of application of the shifting voltage was 3000 seconds, which is about half the case of the first embodiment since the shifting voltage could be applied simultaneously to the two devices.

When the image display apparatus formed by the steps described above was driven at a Vdrv of 14 volts and variations in luminance of the entire display were measured, the standard deviation/average value was 3%, which was the same as the image display apparatus manufactured in the first embodiment.

Though the case in which the visual fields are increased to four has been described in this embodiment, by increasing the number of optical systems, time required for measurement of luminance may be reduced correspondingly.

In this embodiment, there were provided four signals for setting the amplitude of the pulse and the pulse generating circuits, and thus four visual fields are set and the shifting voltage is applied simultaneously to the two devices. However by increasing the number of pulse generating circuits, the number of devices on which the shifting voltage can be applied simultaneously may further be increased correspondingly.

Though the image display apparatus with the SCE devices as an example has been described in detail thus far, it is also possible to apply the present invention to a display apparatus employing a cold cathode electron-emitting device such as the electric field emitting type and the like, a liquid crystal display apparatus, a plasma display panel, or an EL display apparatus as an efficient method of measuring luminance.

As described thus far, according to the present inventions measuring accuracy could be improved while reducing time required for measuring luminance of the pixel.

In addition, the quality of images to be displayed could be improved in association with the improvement of the measuring accuracy.

What is claimed is:

1. A method of manufacturing an image display apparatus, the image display apparatus comprising a plurality of matrix-wired electron-emitting devices and a plurality of fluorescent materials that are caused to emit light by emitted electrons emitted from the electron-emitting devices, wherein a distance of the electron-emitting devices in a first direction is closer than a distance of the electron-emitting devices in a second direction, the method comprising a measuring step of measuring luminance of the fluorescent materials by an area sensor that has no less elements than a number of fluorescent materials in a measurement area, wherein the measuring step comprises measuring luminance of a plurality of fluorescent materials which are caused to emit light by emitted electrons simultaneously emitted from electron-emitting devices arranged in the first direction and non-adjacent in the first direction.

2. A method of manufacturing an image display apparatus, the image display apparatus comprising a plurality of matrix-wired electron-emitting devices and a plurality of fluorescent materials that are caused to emit light by emitted electrons emitted from the electron-emitting devices, wherein a first black stripe is arranged between fluorescent materials adjacent in a first direction and a second black stripe is arranged between fluorescent materials adjacent in a second direction, wherein a width of the first black stripe is less than a width of the second black stripe, the method comprising a measuring step of measuring luminance of the fluorescent materials by an area sensor that has no less elements than a number of fluorescent materials in a measurement area, wherein the measuring step comprises measuring luminance of a plurality of fluorescent materials which are caused to emit light by the emitted electrons simultaneously emitted from electron-emitting devices corresponding to a plurality of fluorescent materials arranged in the first direction and non-adjacent in the first direction.

3. A method according to claim 1, wherein the area sensor measures luminance of at least one fluorescent material by adding outputs of a plurality of elements of the area sensor.

4. A method according to claim 2, wherein the area sensor measures luminance of at least one fluorescent material by adding outputs of a plurality of elements of the area sensor.

5. The method according to claim 1 further comprising: an adjusting step of adjusting luminance of fluorescent materials that are caused to emit light by electrons emitted from electron-emitting devices based on a result of the measuring step.

6. The method according to claim 2 further comprising: an adjusting step of adjusting luminance of fluorescent materials that are caused to emit light by electrons emitted from electron-emitting devices based on a result of the measuring step.

7. The method according to claim 3 further comprising: an adjusting step of adjusting luminance of fluorescent materials that are caused to emit light by electrons emitted from electron-emitting devices based on a result of the measuring step.

8. The method according to claim 4 further comprising: an adjusting step of adjusting luminance of fluorescent materials that are caused to emit light by electrons emitted from electron-emitting devices based on the result of the measuring step.

* * * * *

UNITED STATES PATENT AND TRADEMARK OFFICE
CERTIFICATE OF CORRECTION

PATENT NO. : 7,304,640 B2
APPLICATION NO. : 10/626650
DATED : December 4, 2007
INVENTOR(S) : Masataka Yamashita et al.

It is certified that error appears in the above-identified patent and that said Letters Patent is hereby corrected as shown below:

ON COVER PAGE AT (57) ABSTRACT

Line 13, “devices as” should read --devices--.

COLUMN 1

Line 37, “In” should read --in--;
Line 50, “timesharing” should read --time-sharing--; “th” should read --the--; and
Line 63, “an” should read --and--.

COLUMN 2

Line 1, “A” should read --An--;
Line 20, “In” should read --in--;
Line 31, “in” should read --for--;
Line 36, “d vice” should read --device--; and
Line 39, “the-above described” should read --the above-described--.

COLUMN 3

Line 18, “Influenced” should read --influenced--.

COLUMN 4

Line 3, “In” should read --in--.

COLUMN 5

Line 20, “in” should read --is--.

COLUMN 7

Line 23, “303.” should read --303,--;
Line 25, “Information” should read --information--;
Line 62, “Tx.” should read --Tx,--; and
Line 66, “Information” should read --information--.

UNITED STATES PATENT AND TRADEMARK OFFICE

CERTIFICATE OF CORRECTION

PATENT NO. : 7,304,640 B2 
APPLICATION NO. : 10/626650
DATED : December 4, 2007
INVENTOR(S) : Masataka Yamashita et al.

It is certified that error appears in the above-identified patent and that said Letters Patent is hereby corrected as shown below:

COLUMN 8

Line 10, "now. In." should read --now. ¶ In--;
Line 22, "s tting" should read --setting--; and
Line 42, "Outputs" should read --outputs--.

COLUMN 9

Line 61, "the-desired" should read --the desired--.

COLUMN 10

Line 22, "155 μm × 300 μm." should read --155 μm × 300 μm,--; and
Line 67, "In" should read --in--.

COLUMN 11

Line 23, "se" should read --is--;
Line 27, "2 rs×total" should read --2 ms × total--; and
Line 36, "In" should read --in--.

COLUMN 12

Line 48, "an" should read --on--.

COLUMN 13

Line 16, "In" should read --in--;
Line 18, "the" should read --and the--; and
Line 29, "above mentioned" should read --above-mentioned--.

COLUMN 14

Line 19, "With" should read --with--;
Line 43, "2304:" should read --2304--;
Line 46, "s lected" should read --selected--;
Line 55, "awhile" should read --while--; and
Line 58, "Including" should read --including--.

UNITED STATES PATENT AND TRADEMARK OFFICE
CERTIFICATE OF CORRECTION

PATENT NO. : 7,304,640 B2
APPLICATION NO. : 10/626650
DATED : December 4, 2007
INVENTOR(S) : Masataka Yamashita et al.

It is certified that error appears in the above-identified patent and that said Letters Patent is hereby corrected as shown below:

COLUMN 15

Line 21, “Correspond” should read --correspond--;
Line 64, “device S,” should read --device B,--;
Line 65, “8 Volt.” should read --8 Volt,--; and
Line 67, “In” should read --in--.

COLUMN 16

Line 1, “wh n” should read --when--;
Line 7, “field 4,” should read --field 4, and--;
Line 11, “In” should read --in--;
Line 19, “since-duration” should read --duration--; and
Line 48, “inventions” should read --invention,--.

COLUMN 18

Line 4, “claim 1” should read --claim 1,--;
Line 9, “claim 2” should read --claim 2,--;
Line 14, “claim 3” should read --claim 3,--; and
Line 19, “claim 4” should read --claim 4,--.

Signed and Sealed this

Twenty-sixth Day of May, 2009

John Doll

JOHN DOLL
*Acting Director of the United States Patent and Trademark Office*